United States Patent
Scott et al.

(10) Patent No.: US 8,616,304 B2
(45) Date of Patent: *Dec. 31, 2013

(54) BEARING ASSEMBLIES, AND BEARING APPARATUSES USING THE SAME

(71) Applicant: US Synthetic Corporation, Orem, UT (US)

(72) Inventors: Shawn C. Scott, Payson, UT (US); Jeffrey A. Johns, Mapleton, UT (US); Timothy N. Sexton, Genola, UT (US); Craig H. Cooley, Saratoga Springs, UT (US)

(73) Assignee: US Synthetic Corporation, Orem, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/793,653

(22) Filed: Mar. 11, 2013

(65) Prior Publication Data
US 2013/0186691 A1 Jul. 25, 2013

Related U.S. Application Data

(63) Continuation of application No. 12/761,535, filed on Apr. 16, 2010, now Pat. No. 8,496,075, which is a continuation-in-part of application No. 11/879,867, filed on Jul. 18, 2007, now Pat. No. 7,870,913.

(51) Int. Cl.
*E21B 4/02* (2006.01)

(52) U.S. Cl.
USPC ............. 175/107; 175/104; 384/215; 384/95

(58) Field of Classification Search
USPC ................... 175/104, 107, 92; 384/95, 215
See application file for complete search history.

(56) References Cited

U.S. PATENT DOCUMENTS

| | | | |
|---|---|---|---|
| 3,132,908 | A | 5/1964 | Grotzinger |
| 3,311,431 | A | 3/1967 | Hilliard |
| 3,371,970 | A | 3/1968 | Beerli |
| 3,542,441 | A | 11/1970 | Nixon |
| 3,625,327 | A | 12/1971 | Birdsey et al. |

(Continued)

FOREIGN PATENT DOCUMENTS

| | | |
|---|---|---|
| DE | 4226986 | 2/1994 |
| EP | 0543461 | 5/1993 |

(Continued)

OTHER PUBLICATIONS

International Search Report and Written Opinion from International Application No. PCT/US2006/033201 mailed Dec. 19, 2006.

(Continued)

*Primary Examiner* — David Andrews
(74) *Attorney, Agent, or Firm* — Dorsey & Whitney LLP

(57) ABSTRACT

Various embodiments relate to bearing assemblies configured to enable removal and replacement of superhard bearing elements, and bearing apparatuses that may utilize such bearing assemblies. The disclosed bearing assemblies may be used in a number of applications, such as downhole motors in subterranean drilling systems, directional drilling systems, roller-cone drill bits, and many other applications. In an embodiment, a bearing assembly includes a support ring and a retention ring assembled with the support ring. The bearing assembly further includes a plurality of superhard bearing elements. The retention ring and at least a number of the superhard bearing element are collectively configured to restrict displacement of the at least a number of the superhard bearing elements.

32 Claims, 8 Drawing Sheets

(56) References Cited

U.S. PATENT DOCUMENTS

| | | |
|---|---|---|
| 3,745,623 A | 7/1973 | Wentorf, Jr. et al. |
| 3,858,668 A | 1/1975 | Bell |
| 3,858,669 A | 1/1975 | Jeter |
| 4,129,343 A | 12/1978 | Janssen |
| 4,226,485 A | 10/1980 | Pruvot |
| 4,240,683 A | 12/1980 | Crase |
| 4,256,190 A | 3/1981 | Bodine |
| 4,268,094 A | 5/1981 | Greene |
| 4,345,798 A | 8/1982 | Cortes |
| 4,386,666 A | 6/1983 | Crase et al. |
| 4,410,054 A | 10/1983 | Nagel et al. |
| 4,468,138 A | 8/1984 | Nagel |
| 4,506,998 A | 3/1985 | Showalter |
| 4,515,486 A | 5/1985 | Ide |
| 4,560,014 A | 12/1985 | Geczy |
| 4,604,106 A | 8/1986 | Hall et al. |
| 4,620,601 A | 11/1986 | Nagel |
| 4,629,373 A | 12/1986 | Hall |
| 4,639,146 A | 1/1987 | Yoshioka et al. |
| 4,657,090 A | 4/1987 | Geczy |
| 4,662,348 A | 5/1987 | Hall et al. |
| 4,708,496 A | 11/1987 | McPherson |
| 4,710,036 A | 12/1987 | Geczy |
| 4,720,199 A | 1/1988 | Geczy et al. |
| 4,729,440 A | 3/1988 | Hall |
| 4,732,364 A | 3/1988 | Seger et al. |
| 4,738,322 A | 4/1988 | Hall et al. |
| 4,756,631 A | 7/1988 | Jones |
| 4,764,036 A | 8/1988 | McPherson |
| 4,802,539 A | 2/1989 | Hall et al. |
| 4,818,124 A | 4/1989 | Brandenstein et al. |
| 4,997,292 A | 3/1991 | Klimkovsky et al. |
| 5,092,687 A | 3/1992 | Hall |
| 5,125,754 A | 6/1992 | Ide |
| 5,253,939 A | 10/1993 | Hall |
| 5,364,192 A | 11/1994 | Damm et al. |
| 5,368,398 A | 11/1994 | Damm et al. |
| 5,441,347 A | 8/1995 | Ide |
| 5,480,233 A | 1/1996 | Cunningham |
| 5,498,081 A | 3/1996 | Dennis et al. |
| 5,735,668 A | 4/1998 | Klein |
| 5,743,654 A | 4/1998 | Ide et al. |
| 5,795,077 A | 8/1998 | Gozdawa |
| 5,876,125 A | 3/1999 | Wyndorps et al. |
| 6,000,851 A | 12/1999 | Cohen et al. |
| 6,091,175 A | 7/2000 | Kinsinger |
| 6,422,754 B1 | 7/2002 | Dong et al. |
| 6,424,066 B1 | 7/2002 | Watson et al. |
| 6,488,103 B1 | 12/2002 | Dennis et al. |
| 6,517,246 B2 | 2/2003 | Blakley |
| 6,793,681 B1 | 9/2004 | Pope et al. |
| 7,060,641 B2 | 6/2006 | Qian et al. |
| 7,163,368 B2 | 1/2007 | Ide et al. |
| 7,306,059 B2 | 12/2007 | Ide |
| 7,608,333 B2 | 10/2009 | Eyre |
| 7,703,982 B2 | 4/2010 | Cooley |
| 7,726,420 B2 | 6/2010 | Shen et al. |
| 7,798,257 B2 | 9/2010 | Shen et al. |
| 7,870,913 B1 | 1/2011 | Sexton et al. |
| 7,946,768 B2 | 5/2011 | Cooley et al. |
| 8,069,933 B2 | 12/2011 | Sexton et al. |
| 8,210,747 B2 | 7/2012 | Cooley et al. |
| 2004/0241021 A1 | 12/2004 | Ide et al. |
| 2005/0247492 A1 | 11/2005 | Shen et al. |
| 2006/0278439 A1 | 12/2006 | Ide |
| 2007/0046120 A1 | 3/2007 | Cooley et al. |
| 2007/0110561 A1 | 5/2007 | Ide et al. |
| 2008/0115976 A1 | 5/2008 | Ide |
| 2010/0226759 A1 | 9/2010 | Cooley et al. |
| 2011/0174544 A1 | 7/2011 | Scott et al. |

FOREIGN PATENT DOCUMENTS

| | | |
|---|---|---|
| GB | 2057069 | 3/1981 |
| WO | WO 80/01939 | 9/1980 |
| WO | WO 2007/025117 | 3/2007 |

OTHER PUBLICATIONS

U.S. Appl. No. 11/879,867, Aug. 27, 2009, Office Action.
U.S. Appl. No. 11/879,867, Dec. 1, 2009, Office Action.
U.S. Appl. No. 11/879,867, May 18, 2010, Office Action.
U.S. Appl. No. 11/879,867, Sep. 2, 2010, Notice of Allowance.
U.S. Appl. No. 11/879,867, Nov. 26, 2010, Notice of Allowance.
U.S. Appl. No. 11/879,867, Dec. 28, 2010, Issue Notification.
U.S. Appl. No. 11/212,232, Apr. 13, 2007, Office Action.
U.S. Appl. No. 11/212,232, Jul. 10, 2007, Office Action.
U.S. Appl. No. 11/212,232, Jan. 10, 2008, Office Action.
U.S. Appl. No. 11/212,232, Jun. 17, 2008, Office Action.
U.S. Appl. No. 11/212,232, Dec. 4, 2008, Office Action.
U.S. Appl. No. 11/212,232, Mar. 16, 2009, Office Action.
U.S. Appl. No. 11/212,232, Jul. 31, 2009, Office Action.
U.S. Appl. No. 11/212,232, Dec. 11, 2009, Notice of Allowance.
U.S. Appl. No. 11/212,232, Apr. 7, 2010, Issue Notification.
U.S. Appl. No. 11/465,010, Dec. 23, 2008, Office Action.
U.S. Appl. No. 11/465,010, Oct. 14, 2009, Office Action.
U.S. Appl. No. 11/465,010, Mar. 8, 2010, Office Action.
U.S. Appl. No. 11/465,010, Aug. 11, 2010, Office Action.
U.S. Appl. No. 11/465,010, Jun. 15, 2011, Office Action.
U.S. Appl. No. 11/465,010, Oct. 13, 2011, Office Action.
U.S. Appl. No. 11/465,010, Mar. 6, 2012, Notice of Allowance.
U.S. Appl. No. 11/465,010, Jun. 13, 2012, Issue Notification.
U.S. Appl. No. 12/722,289, Jul. 27, 2010, Office Action.
U.S. Appl. No. 12/722,289, Jan. 14, 2011, Notice of Allowance.
U.S. Appl. No. 12/722,289, Mar. 4, 2011, Notice of Allowance.
U.S. Appl. No. 12/722,289, May 4, 2011, Issue Notification.
U.S. Appl. No. 12/761,535, Oct. 1, 2012, Office Action.
U.S. Appl. No. 12/761,535, Dec. 17, 2012, Notice of Allowance.
U.S. Appl. No. 12/964,208, Apr. 4, 2011, Office Action.
U.S. Appl. No. 12/964,208, Aug. 23, 2011, Notice of Allowance.
U.S. Appl. No. 12/964,208, Nov. 16, 2011, Issue Notification.
U.S. Appl. No. 12/761,535, Mar. 19, 2013, Notice of Allowance.
U.S. Appl. No. 12/761,535, Jul. 10, 2013, Issue Notification.

BEARING ASSEMBLIES, AND BEARING APPARATUSES USING THE SAME

CROSS-REFERENCE TO RELATED APPLICATIONS

This application is a continuation of U.S. Application Ser. No. 12/761,535 filed on Apr. 16, 2010, which is a continuation-in-part of U.S. application Ser. No. 11/879,867 filed on Jul. 18, 2007 (now U.S. Pat. No. 7,870,913), the disclosure of each of which is incorporated herein, in its entirety, by this reference.

BACKGROUND

Subterranean drilling systems that employ downhole drilling motors are commonly used for drilling boreholes in the earth for oil and gas exploration. Subterranean drilling systems typically include a housing enclosing a downhole drilling motor operably connected to an output shaft. One or more thrust-bearing apparatuses may also be operably coupled to the downhole drilling motor for carrying thrust loads generated during drilling operations.

Each thrust-bearing apparatus may include a stator that does not rotate and a rotor that is attached to the output shaft and rotates with the output shaft. The stator and rotor may each include a plurality of superhard bearing elements or inserts. Each superhard bearing element may be fabricated from a polycrystalline diamond compact ("PDC") that provides a diamond bearing surface that bears against other diamond bearing surfaces during use.

In a conventional PDC thrust-bearing apparatus, a thrust-bearing assembly can include a steel support ring that may be configured to accept a number of superhard bearing elements. The superhard bearing elements may be made from a polycrystalline diamond ("PCD") layer formed on a cemented tungsten carbide substrate. The superhard bearing elements may then be brazed into the support ring using a brazing process.

Brazing the superhard bearing elements into the support ring involves high temperatures that can damage (e.g., graphitize) the polycrystalline diamond of the superhard bearing elements and can also cause the bearing ring to warp. In addition, the support ring and superhard bearing elements should be very clean in order to achieve a brazed joint between the support ring and superhard bearing elements with sufficient strength to withstand the forces applied to the superhard bearing elements during drilling operations. Despite best efforts, brazed joints may, nonetheless, fail during use or testing.

Therefore, manufacturers and users of bearing apparatuses continue to seek improved bearing apparatus designs and manufacturing techniques.

SUMMARY

Various embodiments of the invention relate to bearing assemblies configured for selective removal and replacement of superhard bearing elements and bearing apparatuses (e.g., thrust-bearing apparatuses and radial bearing apparatuses) that may utilize such bearing assemblies. The disclosed bearing assemblies may be used in a number of applications, such as downhole motors in subterranean drilling systems, directional drilling systems, roller-cone drill bits, and many other applications.

In an embodiment, a bearing assembly includes a support ring and a retention ring assembled with the support ring. The retention ring includes a plurality of through holes. The bearing assembly further includes a plurality of superhard bearing elements, with each superhard bearing element inserted partially through and projecting from a corresponding one of the through holes of the retention ring. The retention ring and each superhard bearing element are collectively configured to restrict displacement of each superhard bearing element beyond a selected position in a direction away from the support ring.

Other embodiments include bearing apparatuses that may utilize any of the disclosed bearing assemblies and downhole motors for use in drilling systems that may utilize any of the disclosed bearing apparatuses.

In an embodiment, a method of refurbishing a bearing assembly is disclosed. The method includes providing the bearing assembly in a subterranean drilling system. The bearing assembly includes a support ring and a retention ring assembled with the support ring. The retention ring includes a plurality of through holes. The bearing assembly further includes a plurality of superhard bearing elements, with each superhard bearing element inserted partially through and projecting from a corresponding one of the through holes of the retention ring. The retention ring and each superhard bearing element are collectively configured to restrict displacement of each superhard bearing element beyond a selected position in a direction away from the support ring. The method includes uncoupling the retention ring from the support ring, selectively replacing one or more of the plurality of superhard bearing elements with one or more replacement superhard bearing elements, and coupling the retention ring and the support ring together with the one or more replacement superhard bearing elements therebetween.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the invention, wherein identical reference numerals refer to identical elements or features in different views or embodiments shown in the drawings.

DETAILED DESCRIPTION

Various embodiments of the invention relate to bearing assemblies configured for selective removal and replacement of superhard bearing elements and bearing apparatuses (e.g., thrust-bearing apparatuses and radial bearing apparatuses) that may utilize such bearing assemblies. The bearing assemblies are configured so that the superhard bearing elements may be secured in place without using a brazing process, which enables replacement of damaged and/or worn superhard bearing elements in an efficient and cost effective manner. The disclosed bearing assemblies and apparatuses may be used in a number of applications, such as downhole motors in subterranean drilling systems, directional drilling systems, roller-cone drill bits, and many other applications.

Figure 1A:
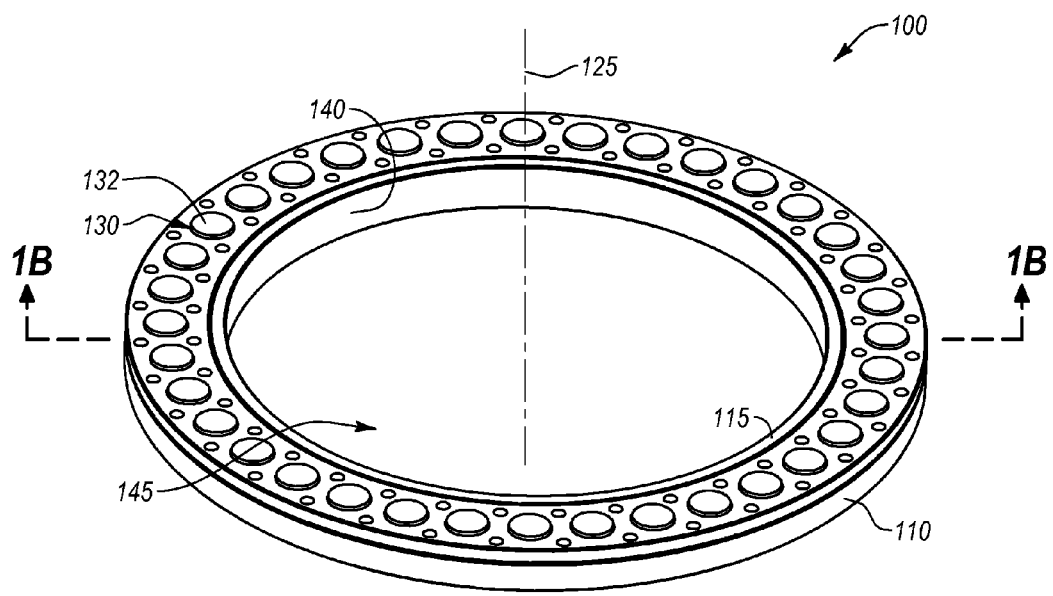
FIG. 1A is an isometric view of a thrust-bearing assembly in accordance with an embodiment.
Figure 1B:
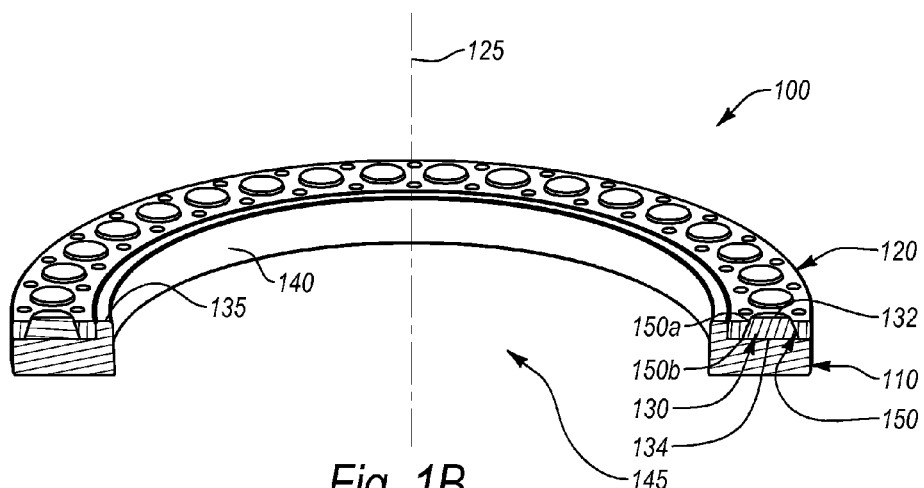
FIG. 1B is an isometric cutaway view of the thrust-bearing assembly shown in FIG. 1A taken along line 1B-1B.

FIGS. 1A and 1B are isometric and isometric cutaway views, respectively, of a thrust-bearing assembly 100 in accordance with an embodiment. The thrust-bearing assembly 100 may form a stator and/or a rotor in a thrust-bearing apparatus used in a subterranean drilling system. The thrust-bearing assembly 100 may include a support ring 110 and a retention ring 120 assembled together. A plurality of superhard bearing elements 130 may be distributed circumferentially about a thrust axis 125 along which a thrust force may be generally directed during use. Each superhard bearing element 130 includes an upper bearing surface 132 and an opposing base 134. As used herein, a superhard bearing element is a bearing element made from a material that exhibits a hardness that is at least as hard as tungsten carbide. In some embodiments, the bearing surface 132 may exhibit a peripherally-extending edge chamfer. In addition, although the bearing surface 132 is shown as being generally planar, in some embodiments, the bearing surface 132 may be convex or concave.

The support ring 110 may include a flange 135 extending from an upper surface thereof that facilitates alignment of the support ring 110 with the retention ring 120. For example, the flange 135 may be disposed about an interior portion of the upper surface of the support ring 110. In an embodiment, the flange 135 may have a height that is substantially the same as the height of the retention ring 120. In an embodiment, the flange 135 may be integrally formed with the support ring 110. In addition, the flange 135 may have a radial outer dimension that is equal to or slightly smaller than a radial inner dimension of the retention ring 120. As a result, the retention ring 120 may seat outside of and about the flange 135 as the flange 135 ensures proper placement of the retention ring 120 and alignment with the support ring 110. The support ring 110 may also include an inner, peripheral surface 140 defining an aperture 145 generally centered about the thrust axis 125. The aperture 145 may receive a motor shaft (e.g., a downhole drilling motor shaft).

Figure 1C:
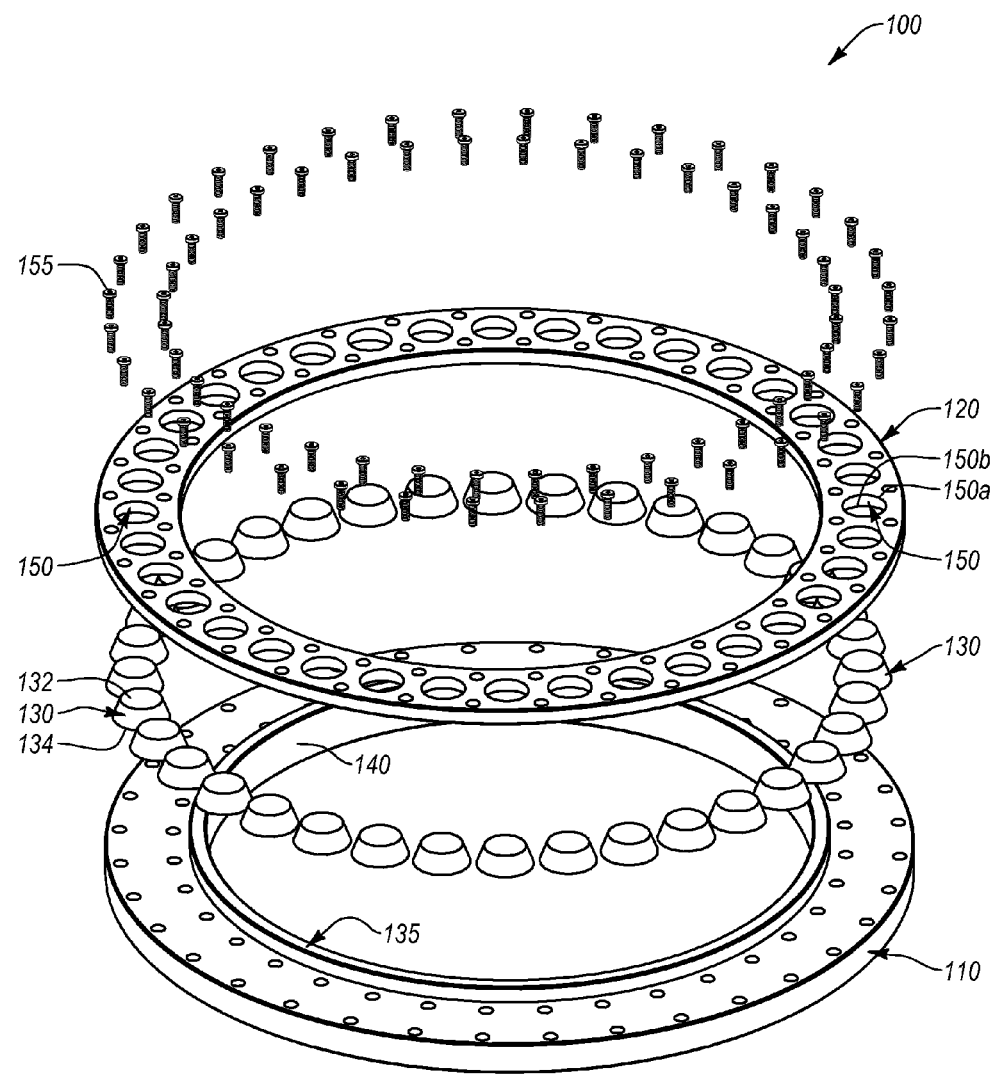
FIG. 1C is an exploded view of the thrust-bearing assembly shown in FIG. 1A.
Figure 1D:
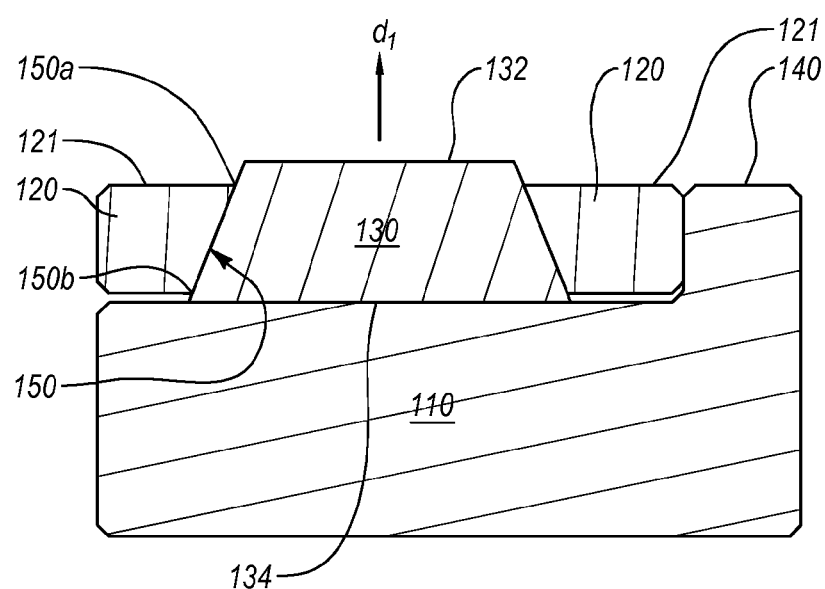
FIG. 1D is an enlarged cross-sectional view of a portion of the thrust-bearing assembly shown in FIG. 1A.

Referring to FIGS. 1C and 1D, the retention ring 120 may include a plurality of through holes 150 extending therethrough in a thickness direction. Each superhard bearing element 130 may be inserted partially through a corresponding one of the through holes 150 to extend beyond a surface 121 of the retention ring 120 by a selected distance. The support ring 110, retention ring 120, and the superhard bearing elements 130 are collectively configured so that displacement of each superhard bearing element 130 in a corresponding one of the through holes 150 is restricted in a direction away from the support ring 110. For example, each bearing through hole 150 may have a cross-sectional shape that restricts displacement of a correspondingly configured superhard bearing element 130 disposed therein in a direction away from the support ring 110 due to physical interference between each superhard bearing element 130 and the retention ring 120. In some embodiments, each superhard bearing element 130 may have a slight interference fit with the retention ring 120 to help prevent any movement of the superhard bearing elements 130.

Figure 1E:
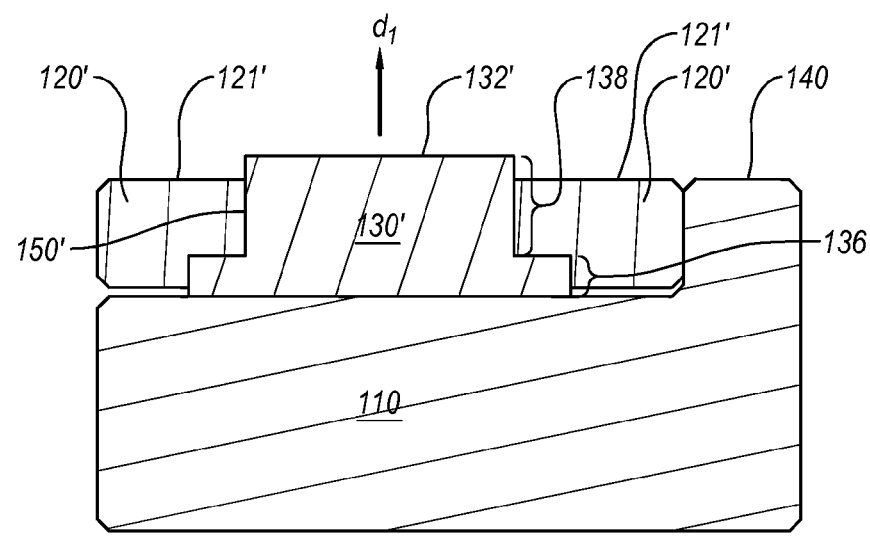
FIG. 1E is a cross-sectional view of a variation of the thrust-bearing assembly according to another embodiment.
Figure 2A:
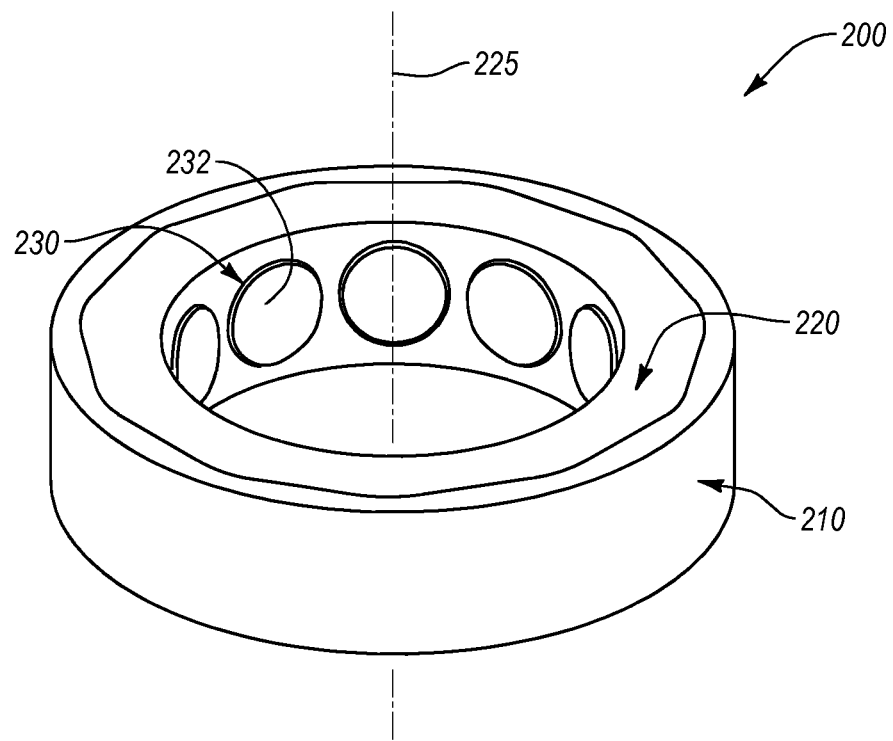
FIG. 2A is an isometric view of a radial bearing assembly in accordance with an embodiment.
Figure 2B:
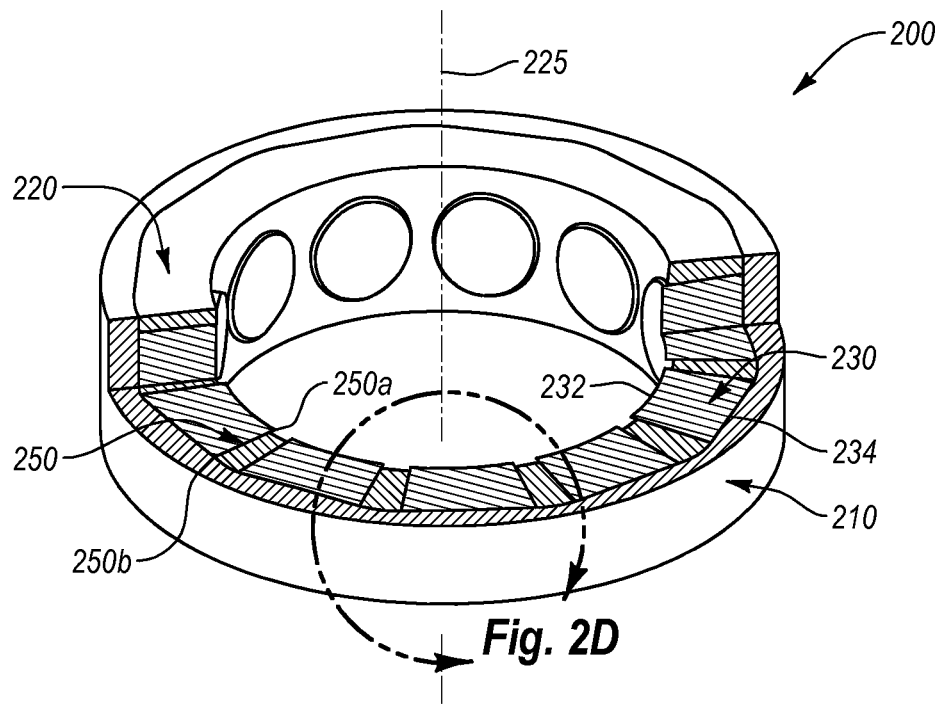
FIG. 2B is an isometric cutaway of the radial bearing assembly shown in FIG. 2A.
Figure 2C:
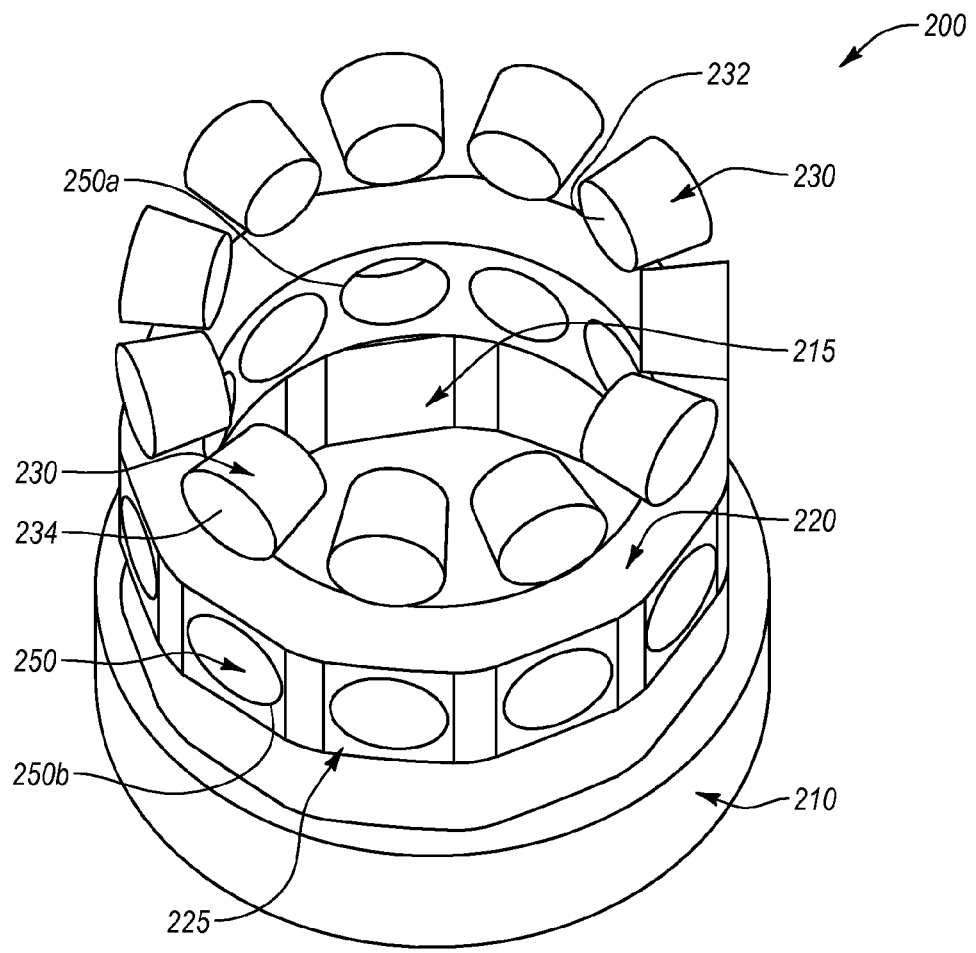
FIG. 2C is an exploded view of the radial bearing assembly shown in FIG. 2A.
Figure 2D:
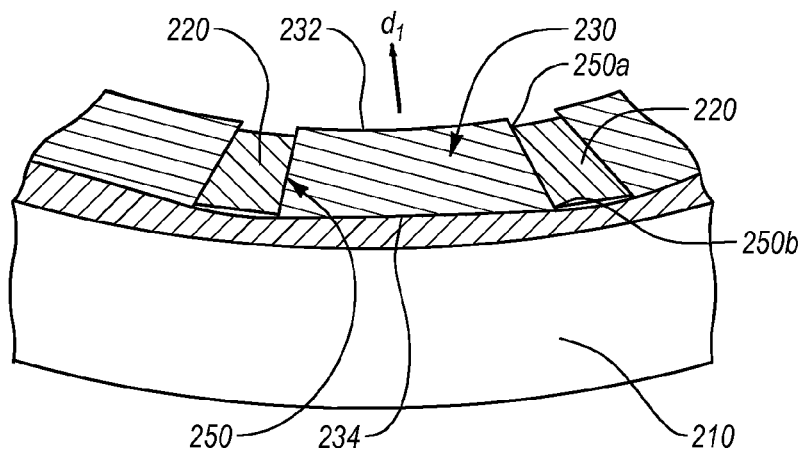
FIG. 2D is an enlarged isometric cutaway view of a portion of the radial bearing assembly shown in FIG. 2A.

In the illustrated embodiment, one or more of the through holes 150 may exhibit a frustoconical cross-sectional geometry having a substantially continuously tapering diameter. As a result, a lower opening 150b of the one or more through holes 150 may have a larger cross-sectional dimension than another portion of the through hole 150 (e.g., an upper opening 150a). For example, the bearing surface 132 of each superhard bearing element 130 may exhibit a smaller cross-sectional lateral dimension (e.g., a diameter) than that of the base 134. In other embodiments, one or more of the superhard bearing elements 130 may include one or more shoulders, steps, or ledges located between the base 134 and the bearing surface 132 that restrict displacement of each superhard bearing element 130 beyond a selected limit in a direction $d_1$ relative to a corresponding one of the through holes 150. For example, FIG. 1E is a cross-sectional view of a variation of the thrust-bearing assembly 100 according to another embodiment. In such an embodiment, a superhard bearing element 130' includes a flange portion 136 and a main portion 138 having a bearing surface 132'. The superhard bearing element 130' is inserted partially through a through hole 150' formed in a retention ring 120' so that the superhard bearing element 130' extends beyond a surface 121' of the retention ring 120' a selected distance. The flange portion 136 cooperates with the retention ring 120' to restrict displacement of the superhard bearing element 130' in a direction $d_1$ away from the support ring 110 due to physical interference of the flange portion 136 with the retention ring 120'.

Turning again to FIGS. 1A and 1B, the support ring 110 and the retention ring 120 may be made from a variety of different materials. For example, the support ring 110 and/or the retention ring 120 may comprise a metallic material (e.g., carbon steel, tungsten or tungsten alloys, aluminum or aluminum alloys, or stainless steel), a carbide material (e.g., tungsten carbide, silicon carbide, etc.), or another suitable material. In some embodiments, the retention ring 120 is made from a relatively high thermal conductivity material (e.g., tungsten carbide) and the superhard bearing elements 130 abut or contact the retention ring 120 and/or the support ring 110 over a substantial surface area of the superhard bearing element 130 to promote heat transfer from the superhard bearing element 130 to the retention ring 120. For example, each superhard bearing element 130 may abut or contact the retention ring 120 and the support ring 110 on at least about 50 percent of the exterior surface area thereof, about 50 percent to about 75 percent of the exterior surface area thereof, or about 45 percent to about 65 percent of the exterior surface area thereof.

In some embodiments, the support ring 110 and/or the retention ring 120 may include an erosion-resistant and abrasion-resistant coating applied thereto. For example, the erosion-resistant and abrasion-resistant coating may include, but not limited to, a coating including a urethane rubber.

The superhard bearing elements 130 may be made from a superhard material, such as polycrystalline diamond, polycrystalline cubic boron nitride, silicon carbide, tungsten carbide, or any combination of the foregoing superhard materials. In an embodiment, one or more of the superhard bearing elements 130 may include polycrystalline diamond. In some embodiments, the polycrystalline diamond may be leached to at least partially or substantially completely remove a metal-solvent catalyst (e.g., cobalt, iron, nickel, or alloys thereof) that was used to sinter the precursor diamond particles that form the polycrystalline diamond. In other embodiments, the polycrystalline diamond may be unleached and include a metal-solvent catalyst (e.g., cobalt, iron, nickel, or alloys thereof) that was used to sinter the precursor diamond particles that form the polycrystalline diamond. In an embodiment, one or more of the superhard bearing elements 130 may have a one-piece configuration without a substrate. For example, one or more of the superhard bearing elements 130 may comprise a polycrystalline diamond body (leached, partially leached, or unleached) that contacts the retention ring 120 and the support ring 110 on at least about 50 percent of the exterior surface area thereof, about 50 percent to about 75 percent of the exterior surface area thereof, or about 45 percent to about 65 percent of the exterior surface area thereof to promote efficient heat transfer away from the superhard bearing elements 130.

In yet another embodiment, one or more of the superhard bearing elements 130 may be configured as a superhard compact with a superhard table bonded to a substrate. For example, the superhard compact may be a PDC including a cobalt-cemented tungsten carbide substrate having a polycrystalline diamond table that was formed on the substrate or bonded to the substrate in a subsequent bonding process.

In some embodiments, the superhard bearing elements 130 may be fabricated to near net shape in a high-pressure/high-temperature process. In other embodiments, the superhard bearing elements 130 may be machined to the final configuration. For example, a polycrystalline diamond body may be machined via electrical-discharge machining and/or grinding, followed by at least partial leaching of the metal-solvent catalyst therein, if desired.

Referring to again FIG. 1C, the thrust-bearing assembly 100 further includes a plurality of fasteners 155 that fasten the retention ring 120 to the support ring 110. As a result, the support ring 110 and retention ring 120 may be selectively coupled and uncoupled from each other. This feature may facilitate the insertion and/or removal of the superhard bearing elements 130. The fasteners 155 may be configured as bolts, screws, interference-fit pins, or other suitable fasteners. In the illustrated embodiment, the fasteners 155 may pass through the retention ring 120 and fasten into the support ring 110. However, in another embodiment, the fasteners 155 may pass through the support ring 110 and fasten into the retention ring 120 so that the fasteners 155 are only exposed from the back side of the support ring 110 that is not typically exposed to drilling mud or other abrasive fluid when the thrust-bearing assembly 100 is used in subterranean drilling applications. The fasteners 155 may provide a clamping force against the superhard bearing elements 130 to limit vibration or other movement of the superhard bearing elements 130 and, in some cases, may close the illustrated gap between the support ring 110 and the retention ring 120. In other embodiments, the support ring 110 may be attached to the retention ring 120 using any of a number of other more permanent fastening techniques, such as welding, brazing, or combinations of the foregoing.

In some embodiments, the bearing surfaces 132 of the superhard bearing elements 130 may not be coplanar with each other after being assembled with the support ring 110 and retention ring 120. The bearing surfaces 132 may be planarized (e.g., by a lapping or grinding process) after or prior to being assembled with the support ring 110 and retention ring 120 so that the bearing surfaces 132 are substantially planar with each other.

In an embodiment, a method of refurbishing the thrust-bearing assembly 100 is disclosed. In practice, the thrust-bearing assembly 100 may be used as part of a thrust-bearing apparatus incorporated in a subterranean drilling system (see FIG. 5). One or more of the superhard bearing elements 130 that are worn may be replaced after the thrust-bearing assembly 100 has been used. For example, after one or more of the superhard bearing elements 130 are worn (e.g., damaged) from use, the retention ring 120 may be uncoupled from the support ring 110 by removing the fasteners 155 so that the plurality of superhard bearing elements 130 can be removed. The one or more worn superhard bearing elements 130 may be selectively removed, as needed or desired, and replaced with one or more replacement superhard bearing elements 130. Following replacement of the one or more worn superhard bearing elements 130, the retention ring 120 and the support ring 110 may be coupled together with the one or more replacement superhard bearing elements 130 and the previously un-replaced superhard bearing elements 130 (if any). One or more of the bearing surfaces 132 may be planarized (e.g., by a lapping process) while assembled with the support ring 110 and retention ring 120 so that the bearing surfaces 132 of the un-replaced superhard bearing elements 130 (if any) and the one or more replacement superhard bearing elements 130 become substantially planar with each other.

In an embodiment, the retention ring 120 may be replaced if it is worn from use or otherwise requires replacement. As a result, aspects of the thrust-bearing assembly 100 may extend the usable life of the thrust-bearing assembly 100.

FIGS. 2A-2D are isometric, isometric cutaway, exploded isometric, and enlarged isometric cutaway views, respectively, of a radial bearing assembly 200 in accordance with an embodiment, which is suitable for use in a subterranean drilling system. The bearings elements of the radial bearing assembly 200 are secured in place using a similar technique to that of the thrust-bearing assembly 100 previously described above and shown in FIGS. 1A-1E. The radial bearing assembly 200 may include a support ring 210 extending about an axis 225. The radial bearing assembly 200 may also include a retention ring 220 that is disposed within an interior opening defined by the support ring 210 and fastened to the support ring 210. The radial bearing assembly 200 further includes a plurality of superhard bearing elements 230 distributed circumferentially about the axis 225. The support ring 210 and the retention ring 220 may be made from the same materials as previously described for the support ring 110 and the retention ring 120 shown in FIGS. 1A-1E. The superhard bearing elements 230 may be made from the same materials, structures (e.g., a superhard compact), and fabricated in the same manner as previously described for the superhard bearing elements 130 shown in FIGS. 1A-1E.

Each superhard bearing element 230 may be inserted partially through a corresponding one of the through holes 250 to project a selected distance from the retention ring 220. The support ring 210, retention ring 220, and superhard bearing elements 230 are collectively configured so that displacement of each superhard bearing element 230 in a corresponding one of the through holes 250 is restricted in a direction $d_1$ away from the support ring 210 and toward the axis 225. For example, each bearing through hole 250 may have a cross-sectional shape that restricts displacement of a correspondingly configured superhard bearing element 230 disposed therein in a direction $d_1$ away from the support ring 210 due to physical interference between each superhard bearing element 230 and the retention ring 220. In some embodiments, each superhard bearing element 230 may have a slight interference fit with the retention ring 220 to help prevent any movement of the superhard bearing elements 230.

In the illustrated embodiment, one or more of the through holes 250 may exhibit a frustoconical cross-sectional geometry having a substantially continuously tapering diameter. As a result, an outer opening 250b of the one or more through holes 250 may have a larger cross-sectional dimension than that of an inner opening 250a. For example, the bearing surface 232 of each superhard bearing element 230 may exhibit a smaller cross-sectional lateral dimension (e.g., a diameter) than that of the base 234. In other embodiments, one or more of the superhard bearing elements 230 may include one or more shoulders, steps, or ledges located between the base 234 and the bearing surface 232 that restrict displacement of the superhard bearing elements 230 beyond a selected position toward the axis 225 and through a corresponding one of the through holes 250.

The radial bearing assembly 200 may also include a plurality of fasteners (not shown) that couple the retention ring 220 to the support ring 210. For example, the fasteners may include bolts, screws, interference-fit pins, or other suitable fasteners. In an embodiment, the fasteners may pass through at least a portion of the retention ring 220 and fasten into the support ring 210. In another embodiment, the fasteners may pass through at least a portion of the support ring 210 and fasten into the body of the retention ring 220. The fasteners may provide a clamping force against the superhard bearing elements 230 to limit vibration or other movement of the superhard bearing elements 230 and, in some cases, may close the illustrated gap between the support ring 210 and the retention ring 220. In other embodiments, the support ring 210 may fasten to the retention ring 220 using any of a number of other more permanent fastening mechanisms, such as welding, brazing, or combinations of the foregoing.

In some embodiments, the center of curvature of at least one, some, or all of the bearing surfaces 232 of the superhard bearing elements 230 may not substantially coincident with each other after being assembled with the support ring 210 and retention ring 220. The bearing surfaces 232 may be machined (e.g., by a grinding process or electro-discharge machining) after or prior to being assembled with the support ring 210 and retention ring 220 so that the bearing surfaces 232 exhibit a center of curvature that is substantially coincident with each other.

In an embodiment, a method of refurbishing the radial bearing assembly 200 is disclosed. In practice, the radial bearing assembly 200 may be used as part of a radial bearing apparatus incorporated in a subterranean drilling system. One or more of the superhard bearing elements 230 that are worn may be replaced after the radial bearing assembly 200 has been used. For example, after one or more of the superhard bearing elements 230 are worn (e.g., damaged) from use, the retention ring 220 may be uncoupled from the support ring 210 by removing the fasteners so that the plurality of superhard bearing elements 230 can be removed. The one or more worn superhard bearing elements 230 may be selectively removed, as needed or desired, and replaced with one or more replacement superhard bearing elements 230. Following replacement of the one or more worn superhard bearing elements 230, the retention ring 220 and the support ring 210 may be coupled together with the one or more replacement superhard bearing elements 230 and the previously un-replaced superhard bearing elements 230. In an embodiment, the retention ring 220 may be replaced if it is worn from use. As a result, aspects of the radial bearing assembly 200 may extend the usable life of the radial bearing assembly 200. One or more of the bearing surfaces 232 may be machined (e.g., by a grinding process, electro-discharge machining, or other machining process) after or prior to be assembled with the support ring 210 and retention ring 220 so that the bearing surfaces 232 of the un-replaced superhard bearing elements 230 (if any) and the one or more replacement superhard bearing elements 230 exhibit a center of curvature that is substantially coincident with each other.

Figure 3:
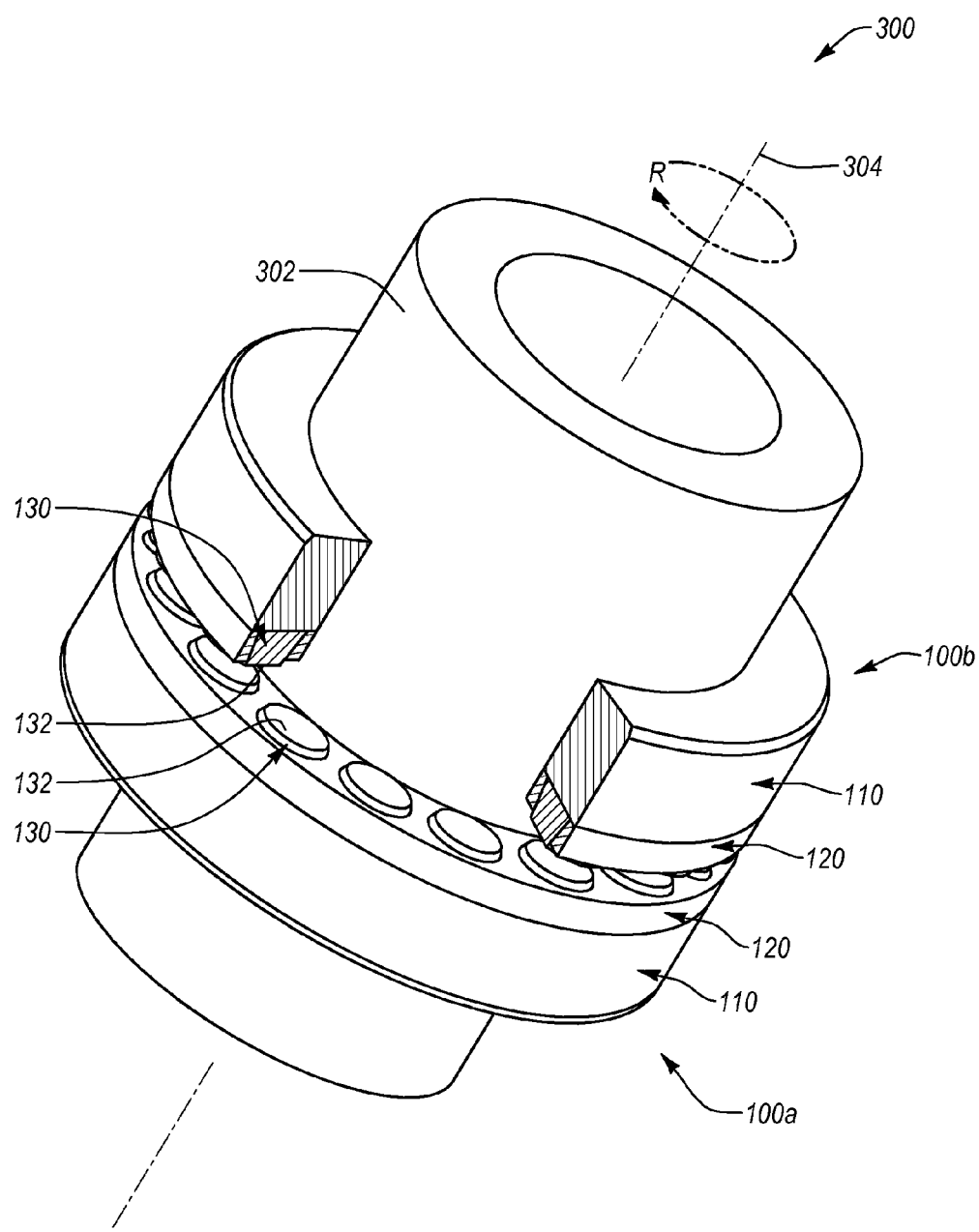
FIG. 3 is an isometric view of a thrust-bearing apparatus in accordance with an embodiment that may include one or more of the disclosed thrust-bearing assemblies.

Any of the previously described thrust-bearing assemblies and radial bearing assemblies may be used in a bearing apparatus that employs two bearing assemblies, at least one of which may be configured as any of the previously described bearing assemblies. FIG. 3 is an isometric view of a thrust-bearing apparatus 300 in accordance with an embodiment. In the illustrated thrust-bearing apparatus 300, two of the thrust bearing assemblies 100 shown in FIGS. 1A-1E are employed and labeled as 100a and 100b.

The thrust-bearing assembly 100a may be attached to and rotate with a shaft 302. Thus, the thrust-bearing assembly 100a functions as a rotor. The shaft 302 may, for example, be operably coupled to an apparatus capable of rotating the shaft 302 in a direction R (or in an opposite direction) about a rotation axis 304, such as a downhole motor. For example, the shaft 302 may extend through and may be secured to the thrust-bearing assembly 100a by press-fitting or threadly coupling the shaft 302 to the thrust-bearing assembly 100a, or another suitable technique. The thrust-bearing assembly 100b is not connected to the shaft 302 and, therefore, functions as a stator that remains stationary while the thrust-bearing assembly 100a rotates. The respective bearing surfaces 132 of the superhard bearing elements 130 of the thrust-bearing assembly 100a oppose and bear against respective bearing surfaces 132 of the superhard bearing elements 130 of the thrust-bearing assembly 100b during use.

Figure 4A:
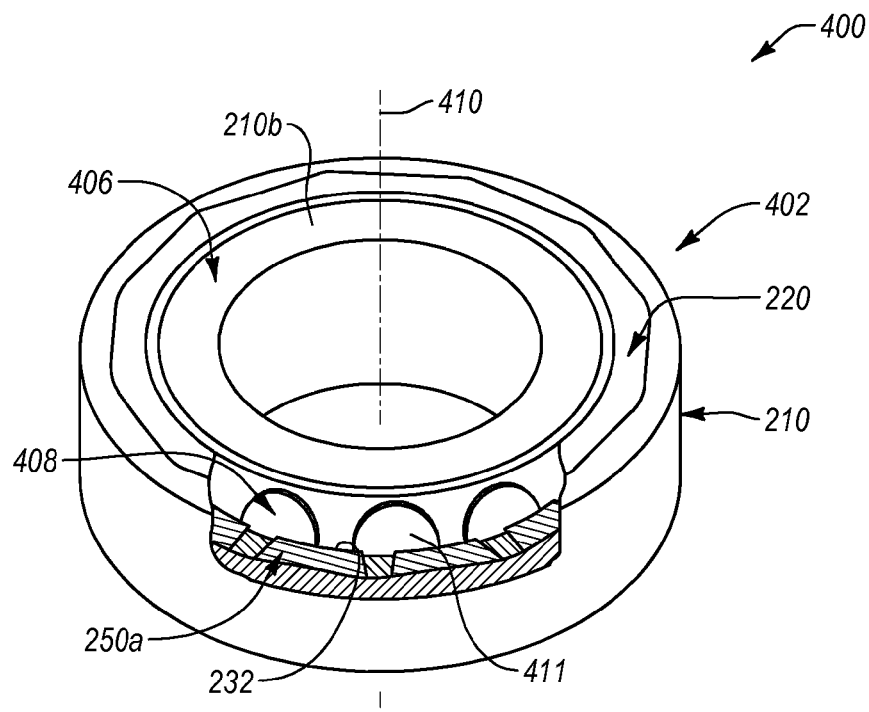
FIG. 4A is an isometric cutaway view of a radial bearing apparatus in accordance with an embodiment that may include one or more of the disclosed radial bearing assemblies.
Figure 4B:
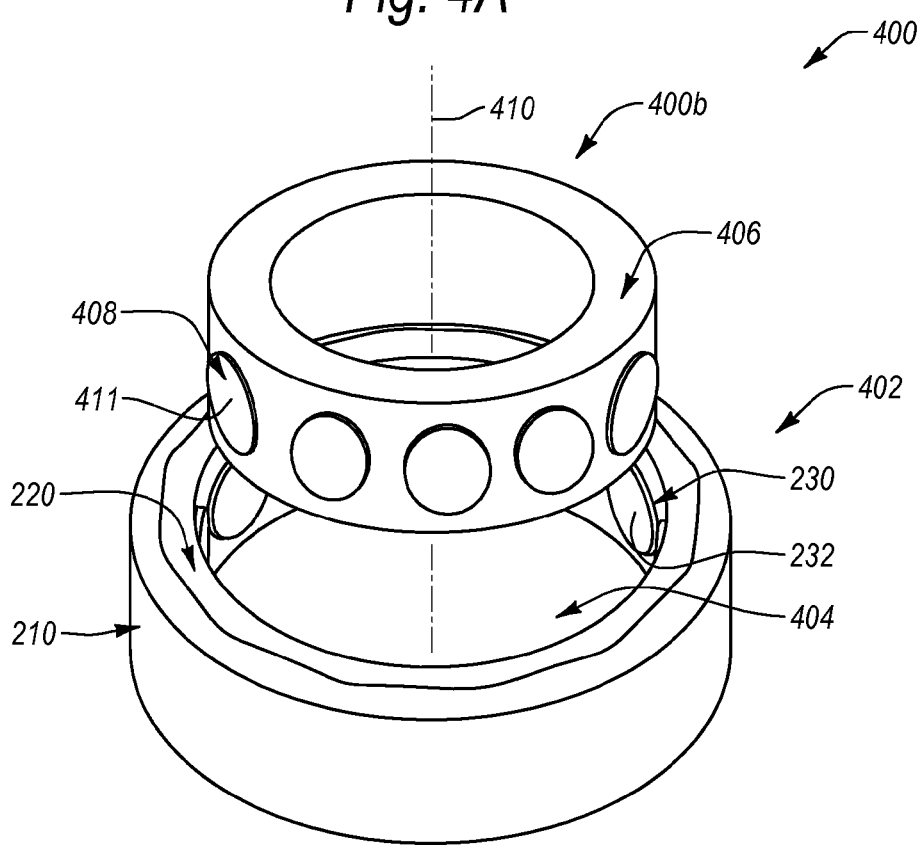
FIG. 4B is an exploded view of the radial bearing apparatus shown in FIG. 4A.

Additional embodiments are directed to radial bearing apparatuses. FIGS. 4A-4B are isometric views of an embodiment of a radial bearing apparatus 400 that may employ one of the radial bearing assemblies 200. The radial bearing apparatus 400 includes a stator or outer race 402 configured as any of the embodiments associated with the radial bearing assembly 200 shown in FIGS. 2A-2D. The outer race 402 defines an aperture 404 that receives a rotor or an inner race 406. The inner race 406 includes a plurality of superhard bearing elements 408 distributed circumferentially about a rotation axis 410, with convex bearing surfaces 411 (e.g., convex cylindrical or spherical bearing surfaces) that oppose and bear against respective concave bearing surfaces 232 (e.g., concave cylindrical or spherical bearing surfaces) of the superhard bearing elements 230 of the outer race 402 during use. In particular, the superhard bearing elements 408 of the inner race 406 may have convex bearing surfaces 411 that correspond to and bear against the concave bearing surfaces 232 of the superhard bearing elements 230 of the outer race 402.

The terms "rotor" and "stator" refer to rotating and stationary components of the radial bearing apparatus 400. Thus, if the inner race 406 is configured to remain stationary, the inner race 406 may be referred to as the stator and the outer race 402 may be referred to as the rotor that rotates about a rotation axis 410.

The radial bearing apparatus 400 may be employed in a variety of different mechanical applications. For example, so-called "roller cone" rotary drill bits may benefit from a radial bearing apparatus disclosed herein. More specifically, the inner race 406 may be mounted or affixed to a spindle of a roller cone and the outer race 402 may be affixed to an inner bore formed within a cone and that such an outer race 402 and inner race 406 may be assembled to form a radial bearing apparatus. It should also be noted, that although the outer race 402 is shown as being configured as the radial bearing assembly 200 of FIGS. 2A-2D, in further implementations, the inner race 406 may additionally or alternatively be configured similar to the radial bearing assembly 200 of FIGS. 2A-2D with the superhard bearing elements 408 retained between a retention ring and a support ring.

Figure 5:
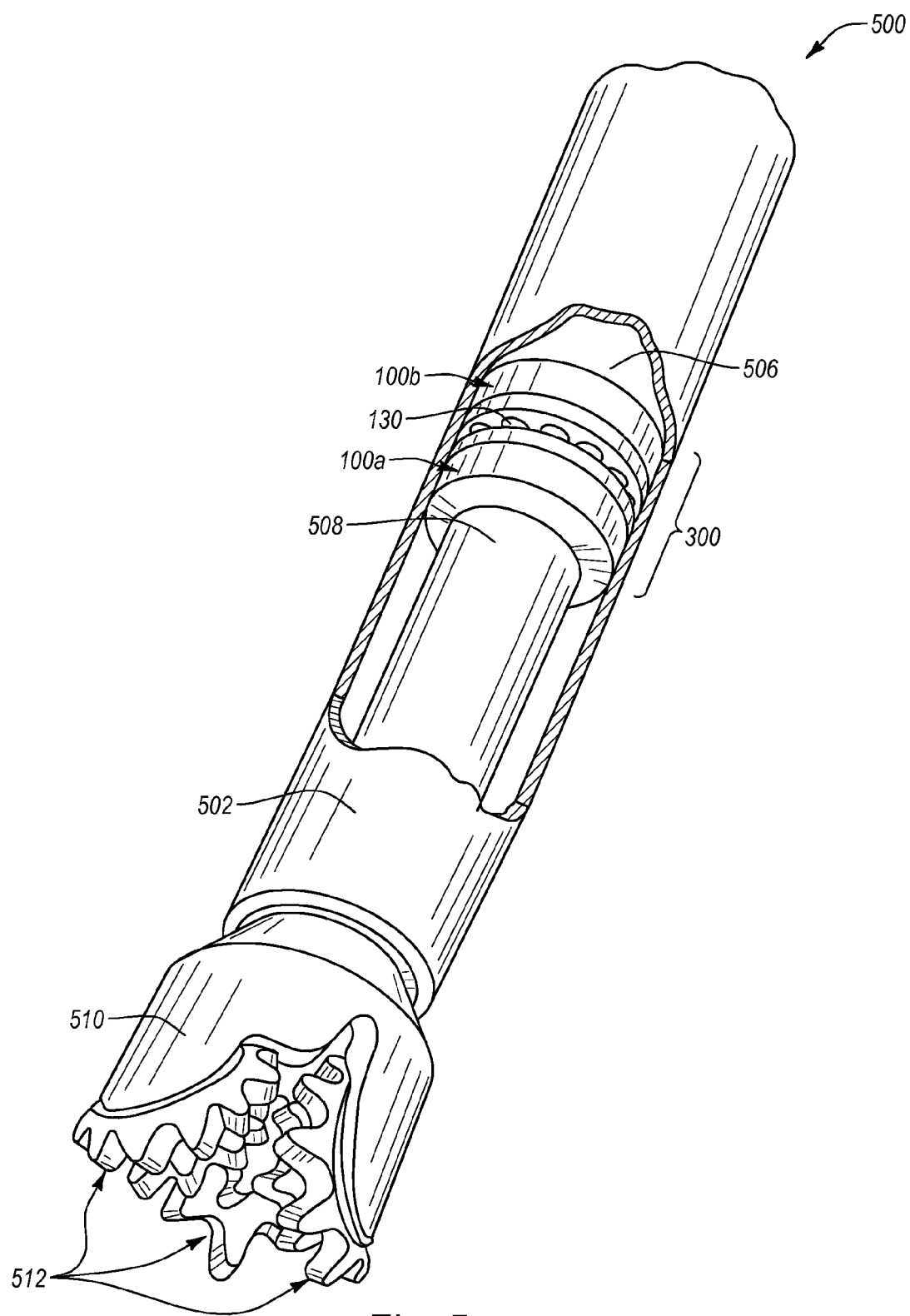
FIG. 5 is a schematic isometric cutaway view of a subterranean drilling assembly in accordance with an embodiment that may include one or more of the disclosed thrust-bearing apparatuses.

Any of the embodiments for bearing apparatuses discussed above may be used in a subterranean drilling system. FIG. 5 is a schematic isometric cutaway view of an embodiment of a subterranean drilling system 500 that may incorporate any of the disclosed bearing apparatuses and is illustrated as including at least one of the thrust-bearing apparatuses 300. The subterranean drilling system 500 includes a housing 502 enclosing a downhole drilling motor 506 (i.e., a motor, turbine, or any other device capable of rotating an output shaft) that is operably connected to an output shaft 508. A thrust-bearing apparatus 300 may be operably coupled to the downhole drilling motor 506. A rotary drill bit 510 configured to engage a subterranean formation and drill a borehole can be connected to the output shaft 508. The rotary drill bit 510 is shown as a "roller cone" type bit including a plurality of roller cones 512. However, other embodiments may utilize different types of rotary drill bits, such as so called "fixed cutter" drill bits. As the borehole is drilled, pipe sections may be connected to the subterranean drilling system 500 to form a drill string capable of progressively drilling the borehole to a greater depth within the earth.

The thrust-bearing apparatus 300 includes a rotor 100a that is attached to the output shaft 508 and rotates with the output shaft 508 and a stator 100b that does not rotate. The rotor 100a and the stator 100b each include a plurality of superhard bearing elements 130. In operation, drilling fluid may be circulated through the downhole drilling motor 506 to generate torque and effect rotation of the output shaft 508 and the rotary drill bit 510 attached thereto so that a borehole may be drilled. The drilling fluid may also be used for lubricating and cooling the bearing surfaces of the superhard bearing elements 130 of the thrust-bearing apparatus 300 during operation.

Although the bearing assemblies and apparatuses described above have been discussed in the context of subterranean drilling systems and applications, in other embodiments, the bearing assemblies and apparatuses disclosed herein are not limited to such use and may be used for many different applications, if desired, without limitation. Thus, such bearing assemblies and apparatuses are not limited for use with subterranean drilling systems and may be used with various other mechanical systems, without limitation.

While various aspects and embodiments have been disclosed herein, other aspects and embodiments are contemplated. The various aspects and embodiments disclosed herein are for purposes of illustration and are not intended to be limiting. Additionally, the words "including," "having," and variants thereof (e.g., "includes" and "has") as used herein, including the claims, shall have the same meaning as the word "comprising" and variants thereof (e.g., "comprise" and "comprises").

What is claimed is:

1. A bearing assembly, comprising:
   a support ring;
   a retention ring assembled with the support ring;
   a plurality of superhard bearing elements each of which includes a lateral periphery extending between a base and a superhard bearing surface; and
   wherein the lateral periphery of each of at least a number of the plurality of superhard bearing elements and the retention ring are cooperatively configured to restrict displacement of the at least a number of the plurality of superhard bearing elements away from the support ring, and the base of each of the at least a number of the plurality of superhard bearing elements contacts the support ring.

2. The bearing assembly of claim 1 wherein the support ring defines a channel that receives the plurality of superhard bearing elements.

3. The bearing assembly of claim 1 wherein the lateral periphery includes a shoulder that restricts displacement away from the support ring.

4. The bearing assembly of claim 1 wherein the retention ring extends about a portion of the lateral periphery of the plurality of superhard bearing elements.

5. The bearing assembly of claim 1 wherein each of the plurality of superhard bearing elements includes a polycrystalline diamond body.

6. The bearing assembly of claim 5 wherein the polycrystalline diamond body is bonded to a substrate.

7. he bearing assembly of claim 5 wherein the polycrystalline diamond body is in direct thermal contact with the retention ring.

8. The bearing assembly of claim 5 wherein the polycrystalline diamond body abuts the retention ring on at least about 50 percent of an exterior surface area thereof.

9. The bearing assembly of claim 5 wherein the polycrystalline diamond body is at least partially leached of catalyst.

10. The bearing assembly of claim 1, further comprising a plurality of fasteners configured to fasten the support ring and retention ring together, wherein each of the plurality of fasteners extends completely through the retention ring.

11. The bearing assembly of claim 1 wherein the base exhibits a larger lateral cross-sectional dimension than that of the superhard bearing surface.

12. The bearing assembly of claim 1 wherein the plurality of superhard bearing elements are distributed circumferentially about a thrust axis.

13. The bearing assembly of claim 1 wherein the plurality of superhard bearing elements are distributed circumferentially about a rotation axis, and wherein the superhard bearing surface of each of the plurality of superhard bearing elements is oriented radially inwardly or outwardly.

14. The bearing assembly of claim 1 wherein the plurality of superhard bearing elements are interference fitted with the retention ring.

15. The bearing assembly of claim 1 wherein the plurality of superhard bearing elements are spaced from each other.

16. A bearing apparatus, comprising:
   a rotor;
   a stator; and
   wherein at least one of the rotor or the stator includes:
      a support ring;
      a retention ring assembled with the support ring;

a plurality of superhard bearing elements each of which includes a lateral periphery extending between a base and a superhard bearing surface; and wherein the lateral periphery of each of at least a number of the plurality of superhard bearing elements and the retention ring are cooperatively configured to restrict displacement of the at least a number of the plurality of superhard bearing elements away from the support ring, and the base of each of the at least a number of the plurality of superhard bearing elements contacts the support ring.

17. The bearing apparatus of claim 16 wherein the stator, the rotor, and the plurality of superhard bearing elements form at least part of a thrust-bearing apparatus.

18. The bearing apparatus of claim 16 wherein the stator, the rotor, and the plurality of superhard bearing elements form at least part of a radial bearing apparatus.

19. The bearing apparatus of claim 16 wherein the lateral periphery includes a shoulder that restricts displacement away from the support ring.

20. The bearing apparatus of claim 16 wherein the retention ring extends about a portion of the lateral periphery of the plurality of superhard bearing elements.

21. The bearing apparatus of claim 16 wherein each of the plurality of superhard bearing elements includes a polycrystalline diamond body.

22. The bearing apparatus of claim 21 wherein the polycrystalline diamond body is bonded to a substrate.

23. The bearing apparatus of claim 21 wherein the polycrystalline diamond body is at least partially leached of catalyst.

24. The bearing apparatus of claim 16 wherein the base exhibits a larger lateral cross-sectional dimension than that of the superhard bearing surface.

25. A motor assembly for use in drilling a subterranean formation, comprising:
 a motor operable to apply torque to a rotary drill bit; and
 a bearing apparatus operably coupled to the motor, the bearing apparatus including a rotor and a stator; and
 wherein at least one of the rotor or the stator includes:
  a support ring;
  a retention ring assembled with the support ring;
  a plurality of superhard bearing elements each of which includes a lateral periphery extending between a base and a superhard bearing surface; and
  wherein the lateral periphery of each of at least a number of the plurality of superhard bearing elements and the retention ring are cooperatively configured to restrict displacement of the at least a number of the plurality of superhard bearing elements away from the support ring, and the base of each of the at least a number of the plurality of superhard bearing elements contacts the support ring.

26. The motor assembly of claim 25 wherein the stator, the rotor, and the plurality of superhard bearing elements form at least part of a thrust-bearing apparatus or a radial bearing apparatus.

27. The motor assembly of claim 25 wherein the lateral periphery includes a shoulder that restricts displacement away from the support ring.

28. The motor assembly of claim 25 wherein the retention ring extends about a portion of the lateral periphery of the plurality of superhard bearing elements.

29. The motor assembly of claim 25 wherein each of the plurality of superhard bearing elements includes a polycrystalline diamond body.

30. The motor assembly of claim 29 wherein the polycrystalline diamond body is bonded to a substrate.

31. The motor assembly of claim 29 wherein the polycrystalline diamond body is at least partially leached of catalyst.

32. The motor assembly of claim 25 wherein the base exhibits a larger lateral cross-sectional dimension than that of the superhard bearing surface.

* * * * *

UNITED STATES PATENT AND TRADEMARK OFFICE
CERTIFICATE OF CORRECTION

| | | |
|---|---|---|
| PATENT NO. | : 8,616,304 B2 | Page 1 of 1 |
| APPLICATION NO. | : 13/793653 | |
| DATED | : December 31, 2013 | |
| INVENTOR(S) | : Scott et al. | |

It is certified that error appears in the above-identified patent and that said Letters Patent is hereby corrected as shown below:

In the Claims

In Column 10, Claim 7, Line 34, delete "he bearing" and insert -- The bearing --, therefor.

Signed and Sealed this
Seventh Day of July, 2015

Michelle K. Lee
*Director of the United States Patent and Trademark Office*